US012792033B2

(12) United States Patent
Moser

(10) Patent No.: US 12,792,033 B2
(45) Date of Patent: Nov. 10, 2026

(54) SYSTEMS AND METHODS FOR CONTROLLING A VEHICLE BY TELEOPERATION BASED ON MAP CREATION

(71) Applicant: Kodiak Robotics, Inc., Mountain View, CA (US)

(72) Inventor: Albert N. Moser, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 285 days.

(21) Appl. No.: 17/892,606

(22) Filed: Aug. 22, 2022

(65) Prior Publication Data

US 2024/0036567 A1 Feb. 1, 2024

Related U.S. Application Data

(63) Continuation-in-part of application No. 17/814,868, filed on Jul. 26, 2022.

(51) Int. Cl.

*G05D 1/00* (2024.01)
*B60W 30/09* (2012.01)
*B60W 60/00* (2020.01)

(52) U.S. Cl.

CPC ........... *G05D 1/0016* (2013.01); *B60W 30/09* (2013.01); *B60W 60/001* (2020.02); *G05D 1/0038* (2013.01); *B60W 2552/05* (2020.02); *B60W 2555/20* (2020.02); *B60W 2555/60* (2020.02); *B60W 2556/40* (2020.02); *B60W 2556/45* (2020.02)

(58) Field of Classification Search

None

See application file for complete search history.

(56) References Cited

U.S. PATENT DOCUMENTS

| | | | | |
|---|---|---|---|---|
| 10,268,191 | B1 | 4/2019 | Lockwood et al. | |
| 11,034,364 | B1 * | 6/2021 | Narang .............. | G01C 21/3673 |
| 2012/0083960 | A1 * | 4/2012 | Zhu ...................... | G05D 1/0214 701/23 |

(Continued)

*Primary Examiner* — Steven Vu Nguyen
*Assistant Examiner* — Melanie G Huber
(74) *Attorney, Agent, or Firm* — Fox Rothschild LLP

(57) ABSTRACT

This disclosure provides systems and methods for controlling a vehicle by teleoperations based on map creation. The method may include: receiving, at the autonomous vehicle, a teleoperation input from a teleoperation system through a communication link, wherein the teleoperation input comprises a modification to at least a portion of an existing trajectory of the autonomous vehicle; and using a processor: generating an updated map data based on the received teleoperation input from the teleoperation system, wherein the updated map data comprises the modification to the least the portion of the existing trajectory; determining a modified trajectory or a new trajectory for the autonomous vehicle based at least in part on the updated map data and by incorporating sensor data from one or more sensors on the autonomous vehicle, wherein the sensor data comprises environmental data associated with a physical environment of the autonomous vehicle; and controlling the autonomous vehicle according to the modified trajectory or the new trajectory.

14 Claims, 7 Drawing Sheets

(56) References Cited

U.S. PATENT DOCUMENTS

| | | | | |
|---|---|---|---|---|
| 2014/0005925 | A1* | 1/2014 | Pierfelice | G01C 21/3438 701/428 |
| 2016/0306349 | A1 | 10/2016 | Lau | |
| 2019/0011912 | A1* | 1/2019 | Lockwood | G05D 1/0044 |
| 2019/0066506 | A1* | 2/2019 | Kazemi | B60W 30/09 |
| 2019/0302761 | A1* | 10/2019 | Huang | G05D 1/0044 |
| 2019/0317491 | A1 | 10/2019 | Kobayashi et al. | |
| 2019/0339701 | A1 | 11/2019 | Pedersen et al. | |
| 2020/0004240 | A1 | 1/2020 | Biehler et al. | |
| 2020/0004241 | A1 | 1/2020 | Levinson et al. | |
| 2020/0192351 | A1* | 6/2020 | Rastoll | G05D 1/0038 |
| 2020/0239023 | A1* | 7/2020 | Srinivasan | G05D 1/0027 |
| 2020/0302195 | A1 | 9/2020 | Thelen et al. | |
| 2020/0310417 | A1 | 10/2020 | Pedersen et al. | |
| 2020/0341470 | A1 | 10/2020 | Maeda et al. | |
| 2021/0009128 | A1 | 1/2021 | Jokela et al. | |
| 2021/0018916 | A1 | 1/2021 | Thakur et al. | |
| 2021/0061278 | A1 | 3/2021 | Zhao et al. | |
| 2021/0149389 | A1* | 5/2021 | Weslosky | G05D 1/0038 |
| 2021/0323573 | A1* | 10/2021 | Gogna | G01C 21/3407 |
| 2022/0194419 | A1* | 6/2022 | Houshmand | B60W 60/0023 |
| 2022/0402520 | A1* | 12/2022 | Hetang | G01C 21/3602 |
| 2023/0236317 | A1* | 7/2023 | Fina | G01S 7/412 342/26 B |
| 2023/0296758 | A1* | 9/2023 | Akbarzadeh | G01S 13/862 382/103 |
| 2024/0185499 | A1 | 6/2024 | Teraguchi | |

* cited by examiner

400

SYSTEMS AND METHODS FOR CONTROLLING A VEHICLE BY TELEOPERATION BASED ON MAP CREATION

CROSS-REFERENCE TO RELATED APPLICATIONS

The present application is a continuation-in-part of U.S. Nonprovisional patent application Ser. No. 17/814,868, filed Jul. 26, 2022. The foregoing application is incorporated by reference herein in its entirety.

FIELD

This disclosure relates generally to systems and methods for controlling a vehicle by teleoperation based on map creation.

BACKGROUND

Autonomous vehicles refer to vehicles that replace human drivers with sensors, computer-implemented intelligence, and other automation technology. Autonomous vehicles can be used to aid in the transport of passengers or items from one location to another. Such vehicles may operate in a fully autonomous mode where passengers may provide some initial input, such as a pickup or destination location, and the vehicle maneuvers itself to that location. While doing so, the safety of the passengers and the vehicle is an important consideration. For example, a vehicle traveling on a road of a road network according to a route to a destination may encounter events along the route that pose safety concerns. In such circumstances, an autonomous vehicle autonomously traveling along the route and encountering such events may require teleoperators' intervention.

Therefore, there is a need for effective systems and methods for controlling an autonomous vehicle by teleoperations.

SUMMARY

This disclosure addresses the above need in a number of aspects. In one aspect, this disclosure provides a method for controlling a vehicle. In some embodiments, the method comprises: receiving, at the autonomous vehicle, a teleoperation input from a teleoperation system through a communication link, wherein the teleoperation input comprises a modification to at least a portion of an existing trajectory of the autonomous vehicle; and using a processor: (a) generating an updated map data based on the received teleoperation input from the teleoperation system, wherein the updated map data comprises the modification to the least the portion of the existing trajectory; (b) determining a modified trajectory or a new trajectory for the autonomous vehicle based at least in part on the updated map data and by incorporating sensor data from one or more sensors on the autonomous vehicle, wherein the sensor data comprises environmental data associated with a physical environment of the autonomous vehicle; and (c) controlling the autonomous vehicle according to the modified trajectory or the new trajectory.

In some embodiments, the method comprises generating the updated map data based on a current position and/or orientation of the autonomous vehicle.

In some embodiments, the method comprises determining, by the teleoperation system or by the autonomous vehicle, an event or a condition associated with a least a portion of the existing trajectory.

In some embodiments, the modification to the existing trajectory may be responsive to the event or condition associated with the at least the portion of the existing trajectory. In some embodiments, the event or condition comprises a road construction, a weather condition, a stop sign, a school zone, an accident zone, or a flood zone.

In some embodiments, the teleoperation input may be entered by a teleoperator. In some embodiments, the teleoperation input comprises a steering input, a throttle input, and/or a brake input. In some embodiments, the updated map data comprises a speed limit determined based on a throttle input and/or a brake input.

In some embodiments, the teleoperation input may be based on real time information of the autonomous vehicle. In some embodiments, the method comprises presenting visualization data that comprises the real time information of the autonomous vehicle on a display to enable the teleoperator to determine whether to intervene in operation of a planner of the autonomous vehicle.

In some embodiments, the teleoperation input comprises a modification to classification of an object or obstacle in an environment of the autonomous vehicle or causing the autonomous vehicle to ignore or avoid the object.

In some embodiments, the communication link comprises a wireless communication link.

In another aspect, this disclosure also may provide a system for controlling an autonomous vehicle. In some embodiments, the system comprises a teleoperation receiver, configured to receive, through a communication link, a teleoperation input from a teleoperation system, wherein the teleoperation input comprises a modification to at least a portion of an existing trajectory of the autonomous vehicle; and a processor, configured to: (a) generate an updated map data based on the received teleoperation input from the teleoperation system, wherein the updated map data comprises the modification to the least the portion of the existing trajectory; (b) determine a modified trajectory or a new trajectory for the autonomous vehicle based at least in part on the updated map data and by incorporating sensor data from one or more sensors on the autonomous vehicle, wherein the sensor data comprises environmental data associated with a physical environment of the autonomous vehicle; and (c) control the autonomous vehicle according to the modified trajectory or the new trajectory.

In some embodiments, the processor is configured to generate the updated map data based on a current position and/or orientation of the autonomous vehicle.

In some embodiments, the processor is configured to determine, by the teleoperation system or by the autonomous vehicle, an event or a condition associated with a least a portion of the existing trajectory.

In some embodiments, the modification to the existing trajectory may be in response to the event or condition associated with the at least the portion of the existing trajectory. In some embodiments, the event or condition comprises a road construction, a weather condition, a stop sign, a school zone, an accident zone, or a flood zone.

In some embodiments, the teleoperation input may be entered by a teleoperator. In some embodiments, the teleoperation input comprises a steering input, a throttle input, and/or a brake input. In some embodiments, the updated map data comprises a speed limit determined based on a throttle input and/or a brake input.

In some embodiments, the teleoperation input may be based on real time information of the autonomous vehicle.

In some embodiments, the teleoperation system may be configured to present visualization data comprising the real time information of the autonomous vehicle on the display to enable the teleoperator to determine whether to intervene in operation of a planner of the autonomous vehicle.

In some embodiments, the teleoperation input comprises a modification to classification of an object or obstacle in an environment of the autonomous vehicle or causing the autonomous vehicle to ignore or avoid the object.

In some embodiments, the communication link comprises a wireless communication link.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

DETAILED DESCRIPTION

Figure 1:
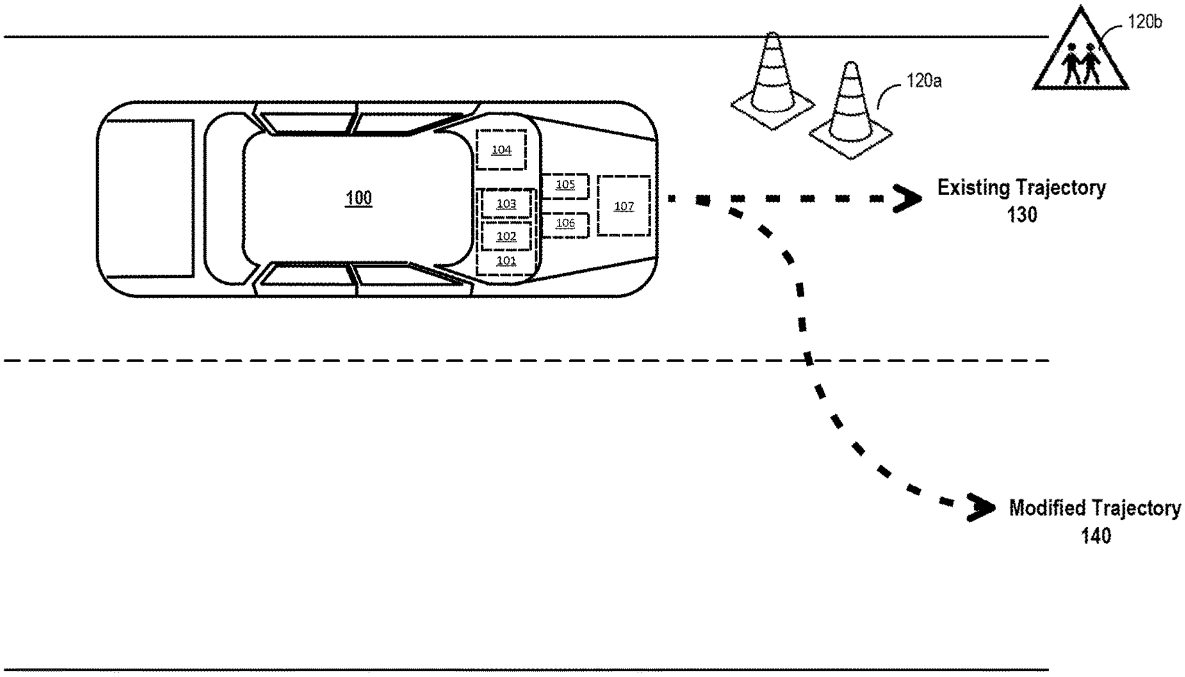
FIG. 1 shows an example method for controlling an autonomous vehicle in response to an event or road condition associated with at least a portion of an existing trajectory, according to various embodiments of the present disclosure.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility," and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

The term "teleoperation" is used broadly to include, for example, any instruction, guidance, command, request, order, directive, or other control of or interaction with an autonomous driving capability of an autonomous vehicle, sent to the autonomous vehicle or the autonomous vehicle system by a communication channel (e.g., wireless or wired). The term "teleoperation command" is used interchangeably with "teleoperation." Teleoperations are examples of interventions.

The term "teleoperator" is used broadly to include, for example, any person or any software process or hardware device or any combination of them that initiates, causes, or is otherwise the source of a teleoperation. A teleoperator may be local to the autonomous vehicle or autonomous vehicle system (e.g., occupying the autonomous vehicle, standing next to the autonomous vehicle, or), or remote from the autonomous vehicle or autonomous vehicle system (e.g., at least 1, 2, 3, 4, 5, 10, 20, 30, 40, 50, 100, 200, 300, 400, 500, 600, 700, 900, or 1000 meters away from the autonomous vehicle).

The term "teleoperation event" is used broadly to include, for example, any occurrence, act, circumstance, incident, or other situation for which a teleoperation would be appropriate, useful, desirable, or necessary.

The term "teleoperation input" is used broadly to include, for example, any communication from a teleoperator or other part of a teleoperation system to an autonomous vehicle or an autonomous vehicle system to in connection with a teleoperation.

The term "trajectory" is used broadly to include, for example, a motion plan or any path or route from one place to another; for instance, a path from a pickup location to a drop off location.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for controlling a vehicle in response to an abnormal condition, according to embodiments of the present disclosure, will be described with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

With reference to FIG. 1, autonomous vehicles, e.g., an autonomous vehicle 100, may be used to bring goods or passengers to desired locations safely. There must be a high degree of confidence that autonomous vehicles will not collide with objects or obstacles in an environment of the autonomous vehicle 100. However, during transit on a road along a route between two places, the autonomous vehicle 100 may encounter an event or a road condition, e.g., 120*a* and 120*b*, that interrupts normal driving procedures, such as events that are either unpredictable in nature, pose safety concerns, or require responses to spontaneous visual cues or direction, such as hand signals provided by a police officer or a construction worker directing traffic. In some instances, due to the nature of the events and road conditions and the potential for adverse impact on travel time, avoiding such events may be desirable.

Accordingly, this disclosure is generally directed to facilitating interactions between the autonomous vehicle 100 and a teleoperation system. The disclosed methods and systems allow the autonomous vehicle 100 to determine a modification to an existing trajectory 130 (i.e., motion plan) of the autonomous vehicle 100 based on input from a teleoperator responsive to events or road conditions, i.e., 120*a* and 120*b*, associated with at least portion of a path in an existing trajectory 130. In determining a modification to the existing trajectory 130, the autonomous vehicle 100 may use a teleoperation input from a teleoperator containing, e.g., a steering wheel angle and/or throttle pedal/brake commands, to create a theoretical map that provides a path for the autonomous vehicle 100 to follow, instead of directly controlling the steering angle and/or the throttle pedal/brake of the autonomous vehicle 100. In the meantime, if the autonomous vehicle 100 contains a planner that avoids objects or obstacles in an environment surrounding the autonomous vehicle 100, the planner may be allowed to avoid the objects or obstacles while following the map generated from the teleoperator's inputs.

FIG. 1 also shows an example of a control system-equipped autonomous vehicle 100, in accordance with various embodiments of the present disclosure. The autonomous vehicle 100 may be any type of vehicle including, but not limited to, cars, trucks, motorcycles, busses, recreational vehicles, agricultural vehicles, construction vehicles etc. According to various embodiments, the autonomous vehicle 100 may include a throttle control system 105 and a braking system 106. According to various embodiments, the autonomous vehicle 100 may include one or more engines 107 and/or one or more computing devices 101. The one or more computing devices 101 may be separate from the automated speed control system 105 or the braking system 106. According to various embodiments, the computing device 101 may include a processor 102 and/or a memory 103. The memory 103 may be configured to store programming instructions that, when executed by the processor 102, are configured to cause the processor 102 to perform one or more tasks. In some embodiments, the autonomous vehicle 100 may include a receiver 104 configured to process the communication between the autonomous vehicle 100 and a teleoperation system.

Figure 2A:
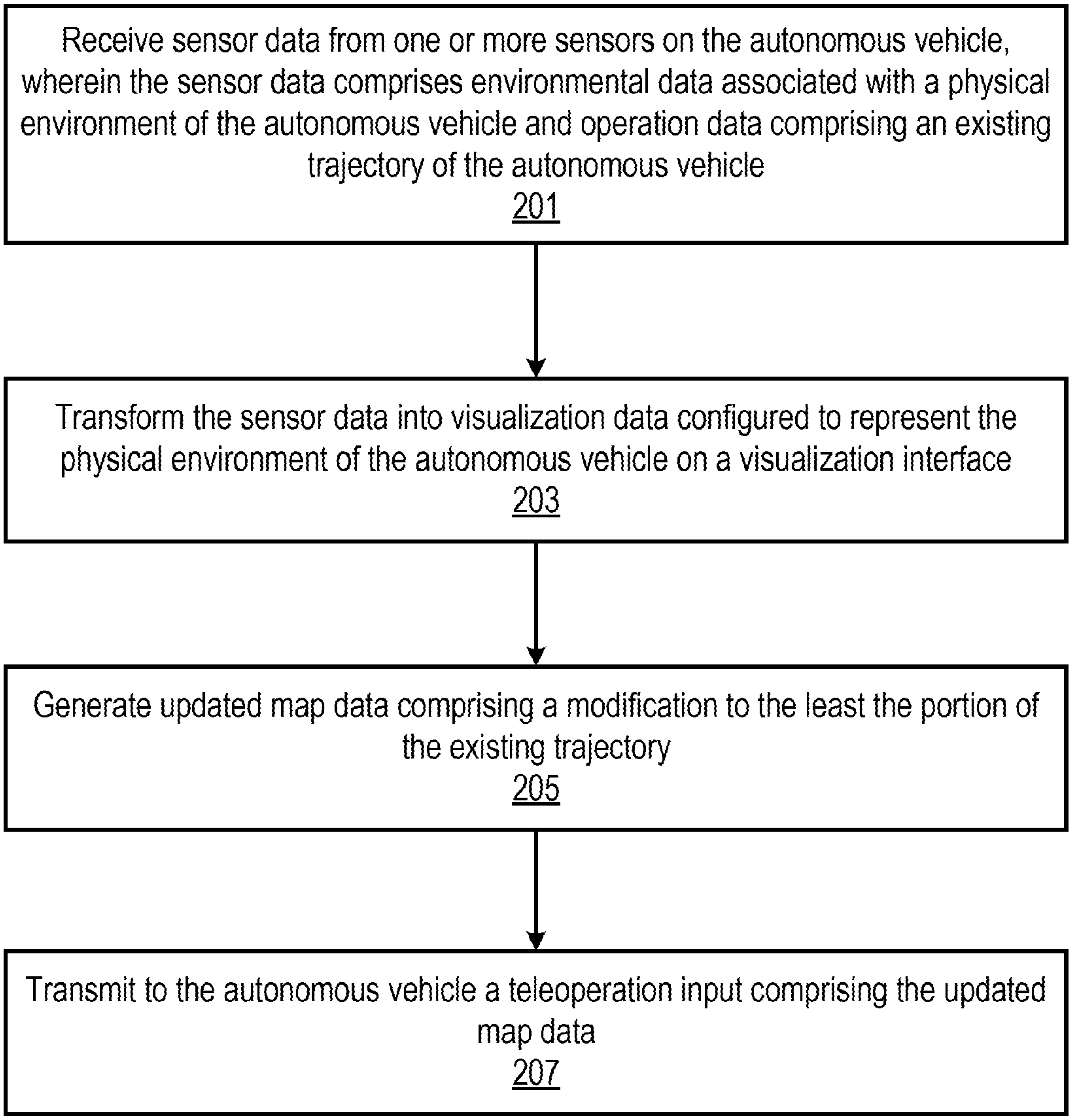
FIG. 2*a* shows an example process for controlling an autonomous through a teleoperation system, according to various embodiments of the present disclosure.

Referring now to FIG. 2*a*, a method may be implemented to control the autonomous vehicle 100 through a teleoperation system based on map creation. In the event the autonomous vehicle 100 encounters an event or a road condition, e.g., 120*a* and 120*b*, that interrupts normal driving procedures, a teleoperator may intervene in operation of a planner of the autonomous vehicle 100 through a teleoperation system. The teleoperation process may be initiated by the teleoperation system, when the teleoperation system or a teleoperator detects an event or a road condition, e.g., 120*a* and 120*b*. Alternatively and/or additionally, the process may be initiated by a teleoperation request sent by the autonomous vehicle 100 to the teleoperation system, when the autonomous vehicle 100 encounters an event or a road condition, e.g., 120*a* and 120*b*.

At 201, the teleoperation system may receive sensor data from one or more sensors disposed on the autonomous vehicle 100 through a communication link. Sensors may include, but are not limited to: LIDAR, RADAR, cameras, monocular or stereo video cameras in the visible light, infrared and/or thermal spectra; ultrasonic sensors, time-of-flight (TOF) depth sensors, speed sensors, temperature sensors, and rain sensors. Accordingly, the sensor data may include LIDAR data, RADAR data, camera data, or any range-sensing or localization data, etc. According to various embodiments, a sensor stream of one or more sensors (e.g., of the same or different modalities) may be fused to form fused sensor data. For example, subsets of LIDAR sensor data and camera sensor data may be fused to form fused sensor data before or after the teleoperation system receives the subsets of Lidar sensor data and camera sensor data.

According to various embodiments, the sensor data may include environmental data associated with physical environment of the autonomous vehicle 100. According to various embodiments, the sensor data may also include operation data comprising an existing trajectory of the autonomous vehicle. According to various embodiments, the operation data may include positioning data, such as GPS data, inertial measurement unit (IMU) data, and other position-sensing data (e.g., wheel-related data, such as steering angles, angular velocity, etc.). According to various embodiments, the teleoperation system may also receive map data (e.g., 3D map data, 2D map data, 4D map data (e.g., including Epoch Determination)) and route data (e.g., road network data, including, but not limited to, Route Network Definition File (RNDF) data (or the like), etc.

At 203, the teleoperation system may transform the sensor data into visualization data configured to represent the physical environment of the autonomous vehicle on a visualization interface (e.g., a screen). For example, the sensor data may be processed and/or normalized in a way that is conducive to efficiently producing a visualization. Accordingly, the method may include transforming environmental data used by an autonomous vehicle 100 into data useful for visualization in visualization interfaces. According to various embodiments, the visualization data may include an environment representation that may abstractly represent the physical environment around an autonomous vehicle 100.

In some embodiments, the representation of the physical environment may begin a certain distance away from the representation of the autonomous vehicle. Additionally and/or alternatively, in some embodiments, the representation of the physical environment may end a certain distance away from the representation of the autonomous vehicle. In some embodiments, the representation of the physical environment may only display objects at certain heights.

In some embodiments, the method may include representations of the vehicle itself, the physical environment of the vehicle, and/or nearby objects detected by the vehicle's sensors.

At 205, the teleoperation system may generate updated map data comprising a modification to the least a portion of the existing trajectory of the autonomous vehicle 100. Such a modification may be in response to an event or road condition associated with at least a portion of an existing trajectory of the autonomous vehicle 100.

According to various embodiments, an event may include one or more of an activity associated with a portion of the path, an object along the path as the autonomous vehicle 100 approaches the object (e.g., people, animals, vehicles, or other static or dynamic objects) or moving with a trajectory toward the driving corridor as the autonomous vehicle 100 approaches the object. In some embodiments, the road condition may correspond to one or more of a construction zone, a school zone, a flood zone, an accident zone, a parade zone, a special event zone, and a zone associated with a slow traffic condition.

According to various embodiments, the teleoperation input may include a modification to classification of an object or obstacle in an environment of the autonomous vehicle 100 or causing the autonomous vehicle to avoid or ignore the object. For example, when the autonomous vehicle 100 enters a school zone, the teleoperation input may increase a confidence level of classifying "small objects" on the path as school children so as to avoid school children.

The disclosed methods do not execute a teleoperator's direction through directly operating a steering wheel, gas (acceleration) pedal, and/or brake (deceleration) pedal. Instead, the method creates a map incorporating the modification to the existing trajectory that provides a new path for the autonomous vehicle 100 to follow.

Accordingly, at 207, the teleoperation system may transmit to the autonomous vehicle a teleoperation input comprising the updated map data. According to various embodiments, the teleoperation input may include guidance, including causing the autonomous vehicle 100 to ignore or avoid the event or road condition (e.g., in a school zone). The teleoperation input may include one or more commands to alter the steering angle of the autonomous vehicle 100 and/or change a throttle or brake position. In some embodiments, the teleoperation input may include a steering input from the teleoperator.

According to various embodiments, the updated map data may include the modification to the least a portion of the existing trajectory to allow the autonomous vehicle 100 to avoid the event or condition, associated with a least a portion of the existing trajectory. In some embodiments, the method may include generating the updated map data based on a position and/or orientation (e.g., current position and/or orientation) of the autonomous vehicle 100.

Figure 2B:
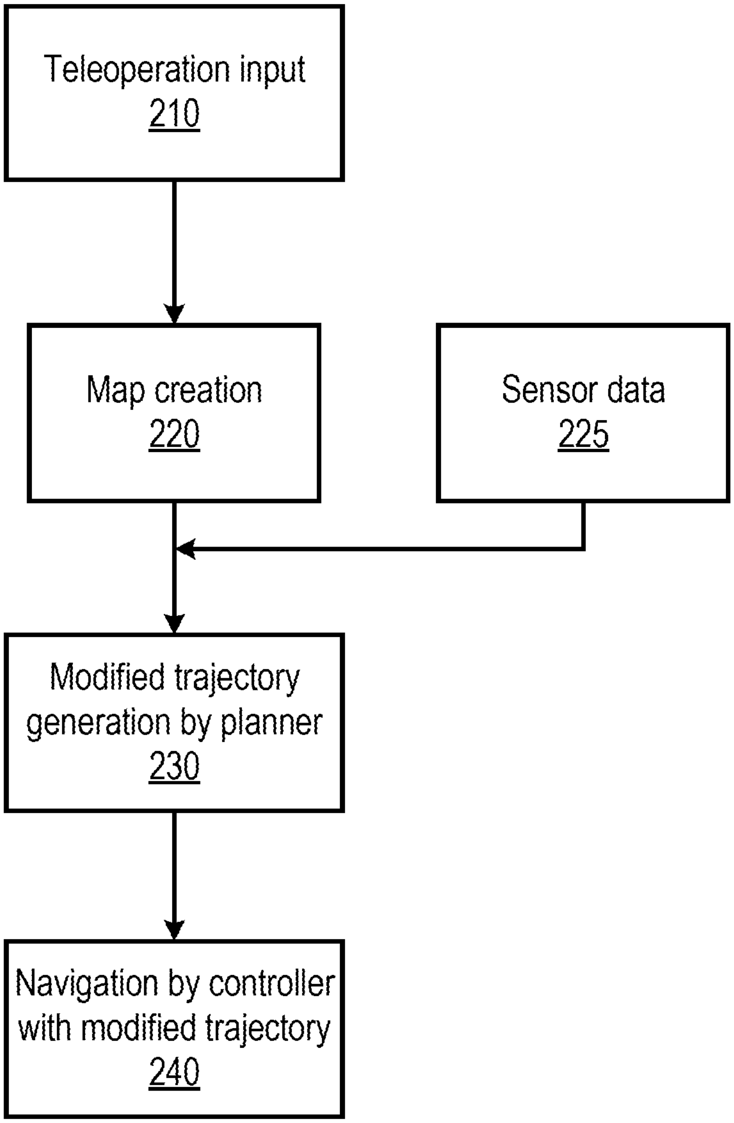
FIG. 2*b* shows an example process for controlling an autonomous through teleoperations based on map creation, according to various embodiments of the present disclosure.

Referring now to FIG. 2*b*, a system may be implemented to control the autonomous vehicle 100 through teleoperation based on map creation. In the event the autonomous vehicle 100 encounters an event or a road condition, e.g., 120*a* and 120*b*, that interrupts normal driving procedures, a teleoperator may intervene in operation of a planner of the autonomous vehicle 100 through a teleoperation system. For example, the teleoperator may enter a teleoperation input containing a steering wheel angle and/or throttle pedal/brake commands through the teleoperation system that is in response to the event or road condition, e.g., 120*a* or 120*b*. The event or road condition may be unpredictable in nature, pose safety concerns, or require responses to spontaneous visual cues or direction, such as hand signals provided by a police officer or a construction worker directing traffic. For example, an event may include one or more of an activity associated with a portion of the path, an object along the path at least partially within the driving corridor as the autonomous vehicle 100 approaches the object (e.g., people, animals, vehicles, or other static or dynamic objects) along the path at least partially within the driving corridor or moving with a trajectory toward the driving corridor as the autonomous vehicle 100 approaches the object. In some embodiments, the road condition may correspond to one or more of a construction zone, a school zone, a flood zone, an accident zone, a parade zone, a special event zone, and a zone associated with a slow traffic condition. In some embodiments, the teleoperation input may provide guidance, including causing the autonomous vehicle 100 to ignore or avoid the event or road condition (e.g., in a school zone).

At 210, the teleoperation system may transmit the teleoperation input to the autonomous vehicle 100, e.g., through a wireless communication link. It should be noted that, unlike the existing driver-assist methods, in the disclosed methods and systems, a teleoperator does not directly control the steering angle, throttle, brake, etc., of the autonomous vehicle 100. Instead, the disclosed methods and systems create a map that provides a path for the autonomous vehicle 100 to follow so as to avoid the event or road conditions. Accordingly, at 220, the autonomous vehicle 100 creates a map containing a path for the autonomous vehicle 100 to traverse and transmits the map to a planner of the autonomous vehicle 100. The map may include an alteration to an existing trajectory to allow the autonomous vehicle 100 to avoid the event or condition, e.g., 120*a* or 120*b*, associated with a least a portion of the existing trajectory.

At 230, the planner may generate a modified trajectory or a new trajectory for the autonomous vehicle 100 based on the map. In generating the modified trajectory or the new trajectory, the planner may modify an existing trajectory by incorporating the map or simply creating a new trajectory to avoid the event or condition, e.g., 120*a* or 120*b*. According to various embodiments, a teleoperation input may also include a throttle input. The throttle input may include a desired level or position of the throttle of a teleoperator. Accordingly to various embodiments, a teleoperation input may include a brake input. The brake input may include a desired level or position of the brake. Accordingly, the modified trajectory or the new trajectory may also include other instructions for the autonomous vehicle 100, including, but not limited to, a speed limit. In some embodiments, the speed limit is determined based on a throttle input and/or a brake input.

Additionally and/or optionally, the planner may generate a modified trajectory or a new trajectory for the autonomous vehicle 100 based on the map and by incorporating sensor data from one or more sensors on the autonomous vehicle.

According to various embodiments, sensors may include, but are not limited to: LIDAR, RADAR, cameras, monocular or stereo video cameras in the visible light, infrared and/or thermal spectra; ultrasonic sensors, time-of-flight (TOF) depth sensors, speed sensors, temperature sensors, and rain sensors. Accordingly, the sensor data may include LIDAR data, RADAR data, camera data, or any range-sensing or localization data, etc. According to various embodiments, a sensor stream of one or more sensors (e.g., of the same or different modalities) may be fused to form fused sensor data. For example, subsets of LIDAR sensor data and camera sensor data may be fused to form fused sensor data before or after the teleoperation system receives the subsets of Lidar sensor data and camera sensor data.

According to various embodiments, the sensor data may include environmental data associated with physical environment of the autonomous vehicle 100. According to various embodiments, the sensor data may also include operation data positioning data, such as GPS data, inertial measurement unit (IMU) data, and other position-sensing data (e.g., wheel-related data, such as steering angles, angular velocity, etc.).

According to various embodiments, the sensor data may include data from high precision and/or high recall detection of objects and obstacles in the environment of the automated vehicle 100. The system may perform high precision detection to detect objects and obstacles of common and known classes. For example, the high precision detection 210 may be carried out by one or more image detectors (e.g., camera) and/or one or more point cloud detectors (e.g., LiDAR) tuned for high precision detection. The objects and obstacles of common and known classes refer to objects or obstacles that can be classified by at least one known classifier (e.g., vehicle classifiers). For example, the objects and obstacles of common and known classes can belong to any classification category, such as other vehicles, bicyclists, or pedestrians. In addition, the high precision detection may further identify contextual information about each object, for example, the speed and pose of the object, direction of movement, presence of other dynamic objects, and other information. After the objects and obstacles of common and known classes are detected, the system may carry out object tracking 212 to track movement of the detected objects over time and maintain their identity (e.g., vehicles, bicyclists, pedestrians) to identify tracked high precision objects. The tracked high precision objects may include the closest vehicle in the same lane or different lanes as the automated vehicle 100.

The system may additionally perform high recall detection to detect objects and obstacles of common and known classes. The high recall detection may be carried out by point cloud clustering by LiDAR, Stereo Depth Vision by RADAR, and/or Monocular Depth Vision using learned low-level features by RADAR, tuned for high recall detection. The system may further perform coverage filtering to remove objects identified by the high recall detection that match the tracked high precision objects, resulting in filtered high recall objections.

At 240, a controller may maneuver the autonomous vehicle according to the modified trajectory or the new trajectory.

Figure 3:
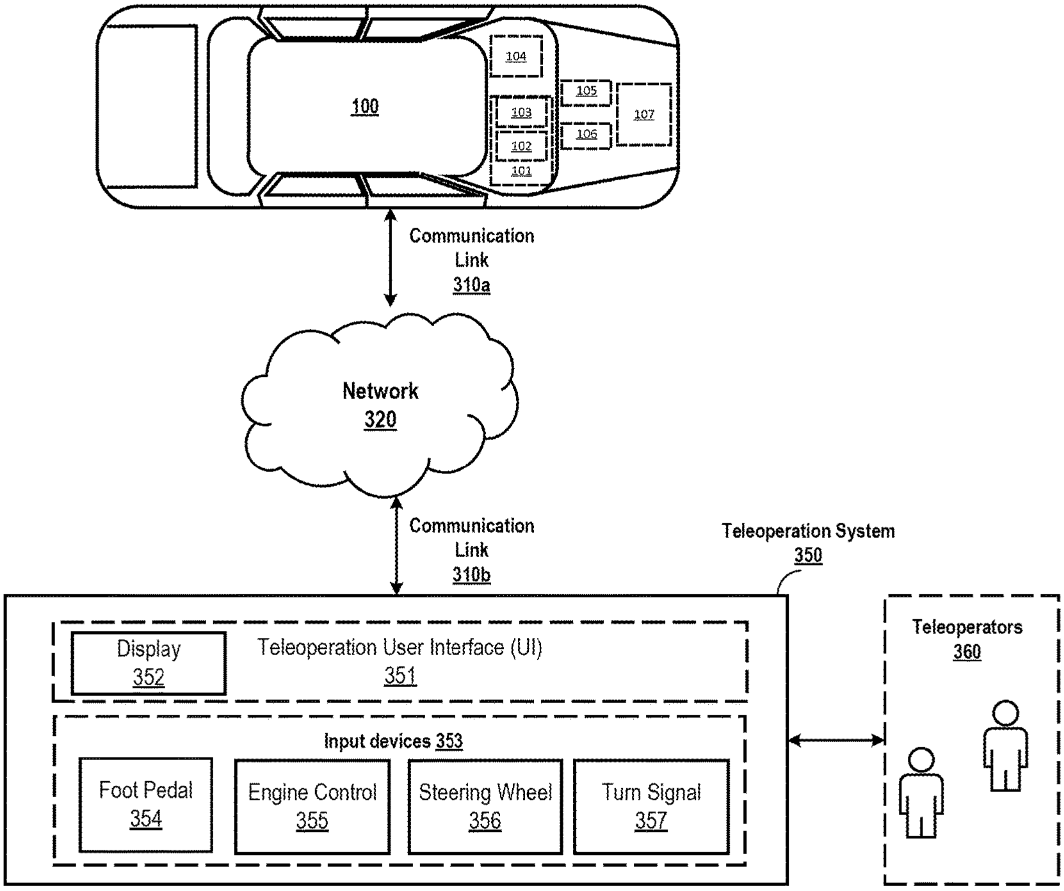
FIG. 3 shows an example system for controlling an autonomous vehicle in response to an event or road condition associated with at least a portion of an existing trajectory, according to various embodiments of the present disclosure.

Referring now to FIG. 3, an example implementation of the disclosed methods for controlling the autonomous vehicle 100 through teleoperations based on map creation is depicted in accordance with various embodiments of the present disclosure. One or more autonomous vehicles 100 may be communicatively connected to a teleoperation system 350 through, e.g., a network 320 and communication links, e.g., 310*a* and 310*b*. A teleoperation system 350 may be located in a remote location, for example, at least 1, 2, 3, 4, 5, 10, 20, 30, 40, 100, 200, 300, 400, 500, 600, 700, 900, or 1000 kilometers away from the autonomous vehicles 100.

The autonomous vehicle 100 may operate autonomously until the autonomous vehicle 100 encounters an event or road condition along a path in an existing trajectory, for which a teleoperations system 350 located remotely from the autonomous vehicle 100 will intervene in operation of a planner of the autonomous vehicle 100. For example, the autonomous vehicle 100 may encounter a construction zone associated with a portion of the path, and traffic in the vicinity of the construction zone may be under the direction of a construction worker who provides instructions for traffic to maneuver around the construction zone. Due in part to the unpredictable nature of this type of event, the teleoperations system 350 may remotely direct the autonomous vehicle 100 via one or more communication networks 320 and communication links, e.g., 310*a* and 310*b*. In some embodiments, the communication link 310*a* or 310*b* may include a wireless communication link (e.g., via a radio frequency ("RF") signal, such as WiFi or Bluetooth®, including BLE, or the like).

In some embodiments, the teleoperations system 350 may include one or more teleoperators 360, which may be human teleoperators located at a teleoperations center. In some examples, one or more of the teleoperators 360 may not be human. For example, they may be computer systems leveraging artificial intelligence (AI), machine learning, and/or other decision-making strategies. As shown in FIG. 3, the teleoperator 360 may interact with one or more autonomous vehicles 100 via a teleoperation user interface 351. In some embodiments, the teleoperation user interface 351 may render to the teleoperator 360 what the autonomous vehicle has perceived or is perceiving. The rendering may be based on real sensor signals or based on simulations. In some implementations, the teleoperation user interface 351 may be replaced by an automatic intervention process that makes any decisions on behalf of the teleoperator 360.

The teleoperation interface 351 may include one or more displays 352 configured to provide the teleoperator 360 with data related to operation of the autonomous vehicle 100, a subset of a fleet of autonomous vehicles 100, and/or the fleet of autonomous vehicles 100. For example, the display(s) 352 may be configured to show data related to real time information about the autonomous vehicle 100, such as sensor signals received from the autonomous vehicles 100, data related to the road condition, and/or the like.

In addition, the teleoperation interface 351 may also include a teleoperator input device 353 configured to allow the teleoperator 360 to provide information to one or more of the autonomous vehicles 100, for example, in the form of teleoperation input providing guidance to the autonomous vehicles 100. The teleoperator input devices 353 may include one or more of a steering wheel, joystick, array of foot pedals, buttons, dials, sliders, gear shift stick, turn signal stalk, touch-sensitive screen, a stylus, a mouse, a dial, a keypad, and/or a gesture-input system configured to translate gestures performed by the teleoperator 360 into input commands for the teleoperation interface 351. As explained in more detail herein, the teleoperations system 360 may provide one or more of the autonomous vehicles 100 with guidance to avoid, maneuver around, or pass through events or road conditions.

In some embodiments, the input devices 353 may include controlling devices that mimic direct control in a vehicle by a driver sitting therein, such as a foot pedal 354 for controlling throttles and/or brakes, an engine control 355 for powering on or off the engine, a steering wheel 356, and a turn signal control 357. In some embodiments, a teleoperator's input through the input devices 353 will be combined and synthesized by the teleoperation system 350 and transmitted to a receiver 104 of the autonomous vehicle 100 via one or more communication networks 320 and communication links, e.g., 310*a* and 310*b*.

Figure 4:
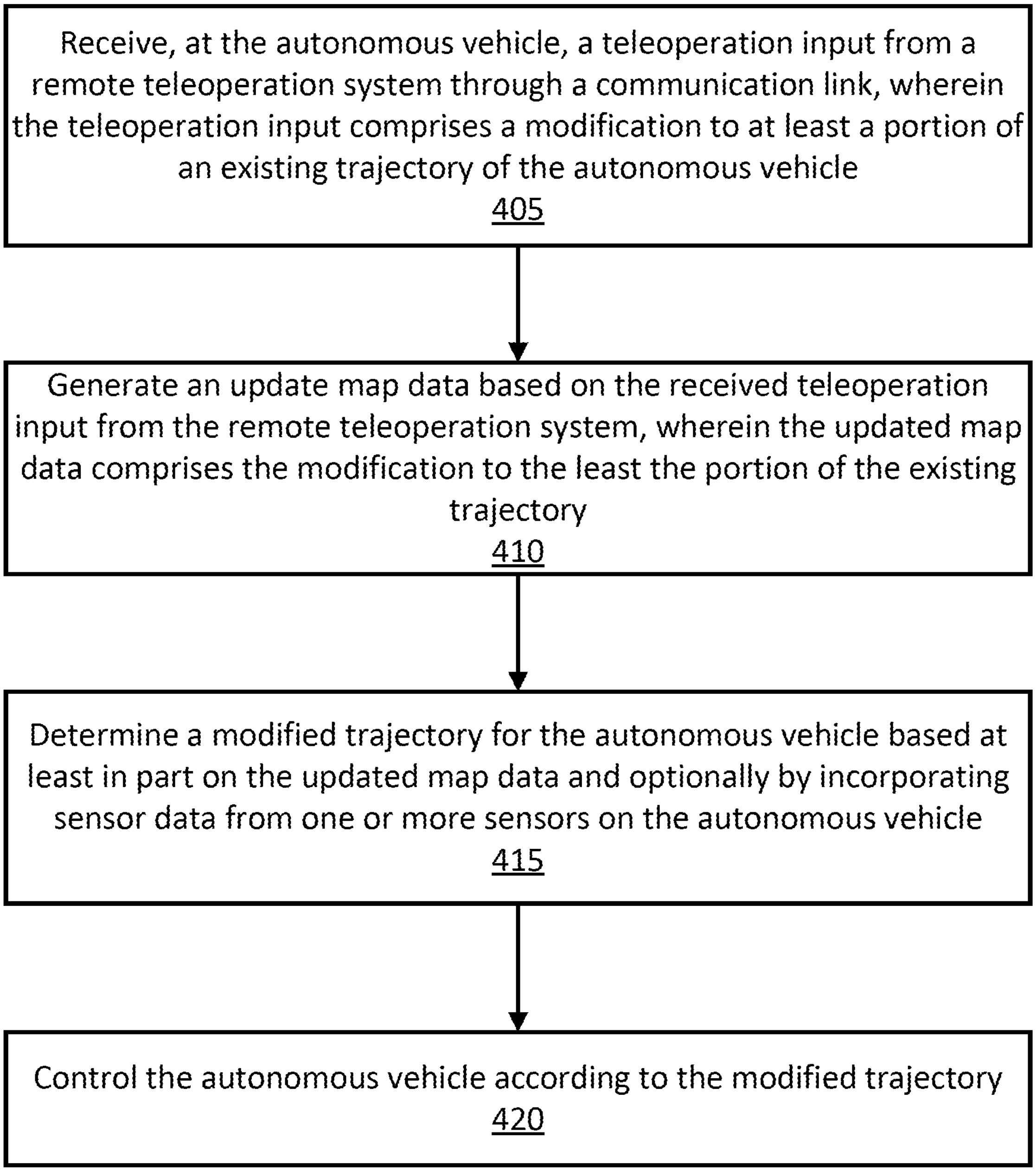
FIG. 4 shows an example method for controlling an autonomous vehicle in response to an event or road condition, according to various embodiments of the present disclosure.

Referring now to FIG. 4, an example method 400 for controlling the autonomous vehicle 100 through teleoperations based on map creation is depicted, in accordance with various embodiments of the present disclosure.

At 405, the method 400 may include receiving, at the autonomous vehicle 100, a teleoperation input from a teleoperation system. As described above, the teleoperation system may include one or more teleoperators. The teleoperators may be human teleoperators located at a remote location, such as a teleoperations center. However, the teleoperators can also be non-human, such as a computer system. As an example, the computer system may employ artificial intelligence (AI), machine learning, and/or other decision-making strategies. The teleoperation system may communicate with the autonomous vehicle 100 via one or more communication networks and communication links. According to various embodiments, the communication link may include a wireless communication link (e.g., via a radio frequency ("RF") signal, such as WiFi or Bluetooth®, including BLE, or the like).

The teleoperation system may include a teleoperation user interface and one or more input devices to allow a teleoperator to enter guidance (e.g., control commands) for the autonomous vehicle 100. For example, the teleoperation system may include one or more visualization units (e.g., displays). The visualization units may be configured to show data related to real time information about the autonomous vehicle, such as sensor signals received from the autonomous vehicles 100, data related to the road condition, and/or the like. In some embodiments, the teleoperation input is entered by a human teleoperator. In some embodiments, the method may include presenting visualization data that may include the real time information of the autonomous vehicle 100 on the display to enable the teleoperator to determine whether to intervene in operation of a planner of the autonomous vehicle 100.

The teleoperation input may include a modification to at least a portion of an existing trajectory of the autonomous vehicle 100. Such a modification may be in response to an event or road condition associated with at least a portion of an existing trajectory of the autonomous vehicle 100. In some embodiments, the teleoperation input may provide guidance, including causing the autonomous vehicle 100 to ignore or avoid the event or road condition (e.g., in a school zone). The teleoperation input may include one or more commands to alter the steering angle of the autonomous vehicle 100 and/or change a throttle or brake position. In some embodiments, the teleoperation input may include a steering input from the teleoperator.

In some embodiments, an event may include one or more of an activity associated with a portion of the path, an object along the path as the autonomous vehicle 100 approaches the object (e.g., people, animals, vehicles, or other static or dynamic objects) or moving with a trajectory toward the driving corridor as the autonomous vehicle 100 approaches the object. In some embodiments, the road condition may correspond to one or more of a construction zone, a school zone, a flood zone, an accident zone, a parade zone, a special event zone, and a zone associated with a slow traffic condition.

In some embodiments, the teleoperation input may include a modification to classification of an object or obstacle in an environment of the autonomous vehicle 100 or causing the autonomous vehicle to avoid or ignore the object. For example, when the autonomous vehicle 100 enters a school zone, the teleoperation input may increase a confidence level of classifying "small objects" on the path as school children so as to avoid school children.

At 410, the method 400 may include generating an updated map data based on the received teleoperation input from the remote teleoperation system and transmitting the map to a planner of the autonomous vehicle 100. In some embodiments, the updated map data may include the modification to the least a portion of the existing trajectory to allow the autonomous vehicle 100 to avoid the event or condition, associated with a least a portion of the existing trajectory. In some embodiments, the method may include generating the updated map data based on a position and/or orientation (e.g., current position and/or orientation) of the autonomous vehicle 100.

As mentioned above, the disclosed methods do not execute a teleoperator's direction through directly operating a steering wheel, gas (acceleration) pedal, and/or brake (deceleration) pedal. Instead, the method creates a map incorporating the modification to the existing trajectory that provides a new path for the autonomous vehicle 100 to follow.

At 415, the method 400 may include determining, by a planner, a modified trajectory or a new trajectory for the autonomous vehicle 100 based at least in part on the updated map data. For example, in generating the modified trajectory or the new trajectory, the planner may modify an existing trajectory by incorporating the map or simply creating a new trajectory for the autonomous vehicle 100 to avoid the event or condition. The planner may be allowed to avoid the objects or obstacles while following the map generated from the teleoperator's inputs.

According to various embodiments, in generating the modified trajectory or the new trajectory, the planner may modify an existing trajectory or create a new trajectory for the autonomous vehicle 100 by incorporating sensor data from one or more sensors on the autonomous vehicle. According to various embodiments, the sensor data may include LIDAR data, RADAR data, camera data, or any range-sensing or localization data, etc. According to various embodiments, a sensor stream of one or more sensors (e.g., of the same or different modalities) may be fused to form fused sensor data. For example, subsets of LIDAR sensor data and camera sensor data may be fused to form fused sensor data before or after the teleoperation system receives the subsets of Lidar sensor data and camera sensor data.

According to various embodiments, the sensor data may include environmental data associated with physical environment of the autonomous vehicle 100. According to various embodiments, the sensor data may include positioning data, such as GPS data, inertial measurement unit (IMU) data, and other position-sensing data (e.g., wheel-related data, such as steering angles, angular velocity, etc.).

According to various embodiments, the sensor data may include data from high precision and/or high recall detection of objects and obstacles in the environment of the automated vehicle 100. The system may perform high precision detection to detect objects and obstacles of common and known classes. For example, the high precision detection 210 may be carried out by one or more image detectors (e.g., camera) and/or one or more point cloud detectors (e.g., LiDAR) tuned for high precision detection. The objects and obstacles of common and known classes refer to objects or obstacles that can be classified by at least one known classifier (e.g., vehicle classifiers). For example, the objects and obstacles of common and known classes can belong to any classification category, such as other vehicles, bicyclists, or pedestrians. In addition, the high precision detection may further identify contextual information about each object, for example, the speed and pose of the object, direction of movement, presence of other dynamic objects, and other information.

The system may additionally perform high recall detection to detect objects and obstacles of common and known classes. The high recall detection may be carried out by point cloud clustering by LiDAR, Stereo Depth Vision by RADAR, and/or Monocular Depth Vision using learned low-level features by RADAR, tuned for high recall detection. The system may further perform coverage filtering to remove objects identified by the high recall detection that match the tracked high precision objects, resulting in filtered high recall objections.

At 420, the method 400 may further include controlling, e.g., by a controller, the autonomous vehicle according to the modified trajectory or the new trajectory.

Figure 5:
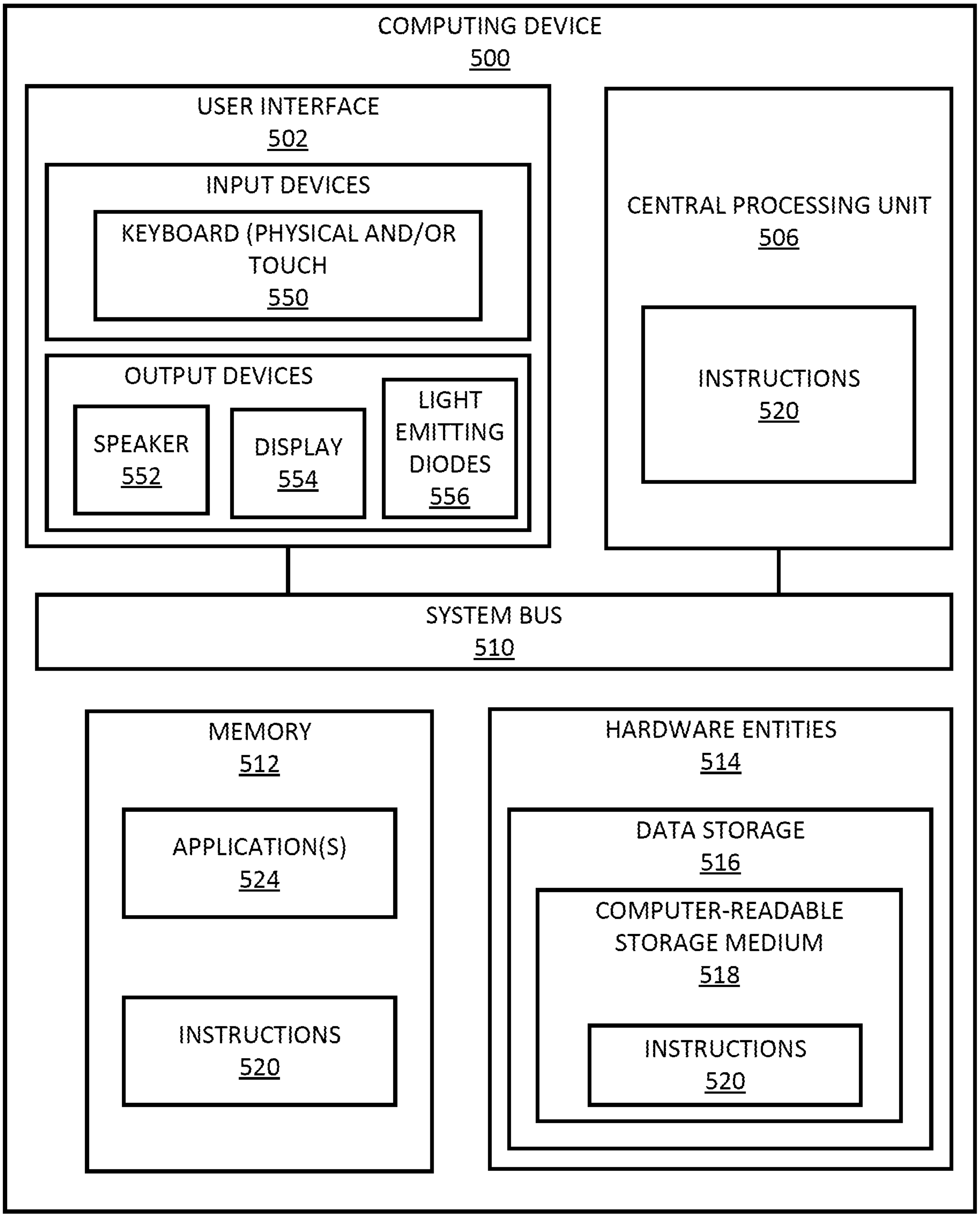
FIG. 5 shows example elements of a computing device, according to various embodiments of the present disclosure.

Referring now to FIG. 5, an illustration of an example architecture for a computing device 500 is provided. The main computing system 210 or the secondary controlling system 220 of FIG. 1 may be the same as or similar to computing device 500. As such, the discussion of computing device 500 is sufficient for understanding the main computing system 210 or the secondary controlling system 220 of FIG. 1, for example.

Computing device 500 may include more or fewer components than those shown in FIG. 1. The hardware architecture of FIG. 5 represents one example implementation of a representative computing device configured to one or more methods and means for controlling the autonomous vehicle 100 in response to an abnormal condition of the autonomous vehicle 100, as described herein. As such, the computing device 500 of FIG. 5 implements at least a portion of the method(s) described herein (for example, method 300 of FIG. 3 and/or method 400 of FIG. 4).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices and output devices, which facilitate user-software interactions for controlling operations of the computing device 500. The input devices may include, but are not limited to, a physical and/or touch keyboard 550. The input devices can be connected to the computing device 500 via a wired or wireless connection (e.g., a Bluetooth® connection). The output devices may include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a data storage 516 comprising a computer-readable storage medium 518 on which is stored one or more sets of instructions 520 (e.g., programming instructions such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media," as used here, refers to a single medium or multiple media (e.g., a centralized or distributed database, and/or associated caches and servers) that store the one or more sets of instructions 520. The term "machine-readable media," as used here, also refers to any medium that is capable of storing, encoding or carrying a set of instructions 520 for execution by the computing device 500 and that cause the computing device 500 to perform any one or more of the methodologies of the present disclosure.

Figure 6:
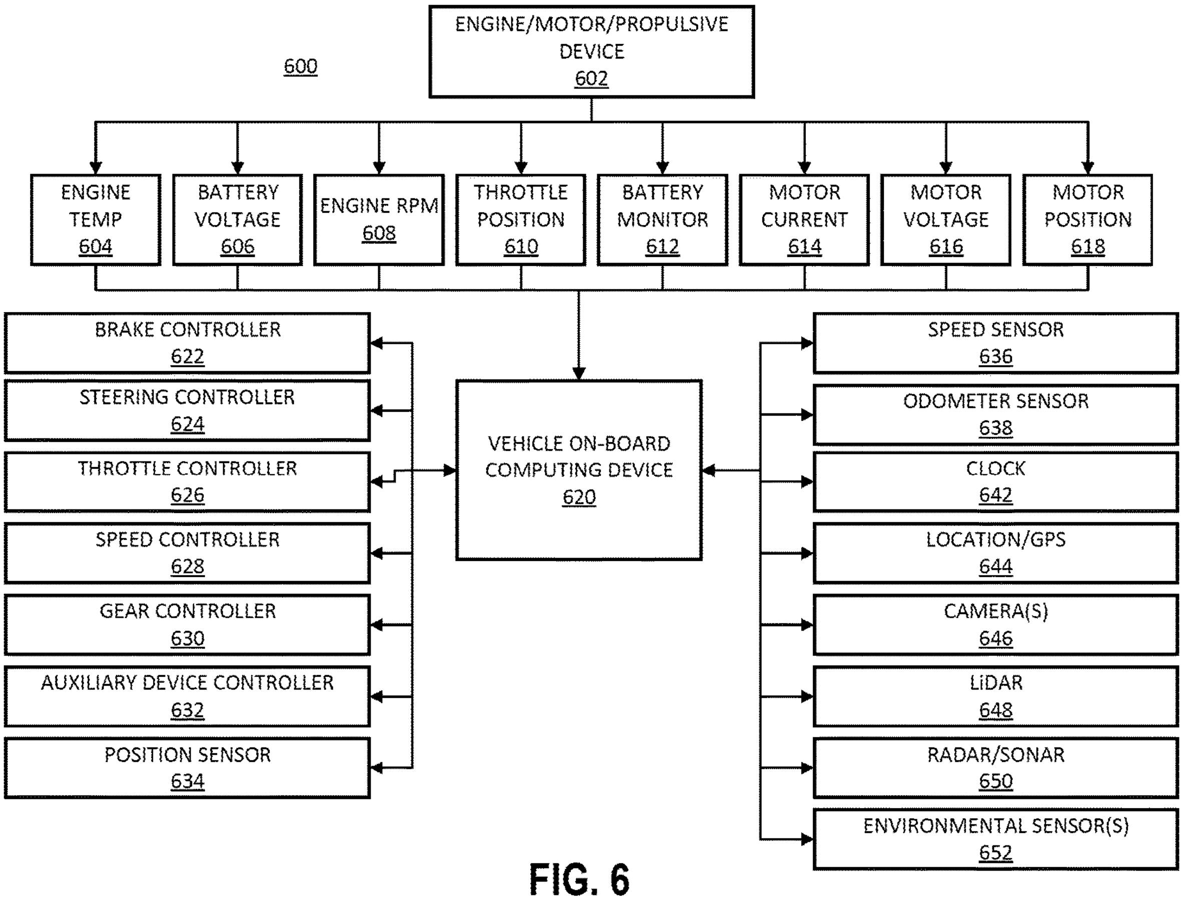
FIG. 6 shows an example architecture of a vehicle, according to various embodiments of the present disclosure.

Referring now to FIG. 6, an example vehicle system architecture 600 for a vehicle is provided, in accordance with various embodiments of the present disclosure.

The autonomous vehicle 100 of FIG. 1 can have the same or similar system architecture as shown in FIG. 6. Thus, the following discussion of vehicle system architecture 600 is sufficient for understanding the autonomous vehicle 100 of FIG. 1.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles include, for example, a position sensor 634, such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle onboard computing device 620. It may be a separate device, or multiple clocks may be available.

The vehicle system architecture 600 also may include various sensors that operate to gather information about the environment in which the vehicle is traveling. These sensors may include, for example, a location sensor 644 (for example, a Global Positioning System (GPS) device); object detection sensors such as one or more cameras 646; a LiDAR sensor system 648; and/or a radar and/or a sonar system 650. The sensors also may include environmental sensors 652, such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an onboard computing device 620. The onboard computing device 620 may be configured to analyze the data captured by the sensors and/or data received from data providers, and may be configured to optionally control operations of the vehicle system architecture 600 based on the results of the analysis. For example, the onboard computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 644 to the onboard computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 are communicated from those sensors to the onboard computing device 620. The object detection information and/or captured images are processed by the onboard computing device 620 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method of controlling an autonomous vehicle, comprising:

receiving, at the autonomous vehicle, a teleoperation input from a teleoperation system through a communication link, wherein the teleoperation input is formed by combining and synthesizing inputs entered into the teleoperation system by a teleoperator mimicking direct control of a vehicle by a driver, and wherein the inputs comprise a steering input to alter a steering angle of the vehicle, a throttle input to change a throttle position for the vehicle, and/or a brake input to change a brake position for the vehicle; and using a processor of the autonomous vehicle:

generating an updated map based on (i) the received teleoperation input from the teleoperation system, (ii) a current position and a current orientation of the autonomous vehicle and (iii) an existing trajectory of the autonomous vehicle, wherein the updated map provides a new path for the autonomous vehicle to traverse for avoiding an event or road condition;

providing the updated map to a planner of the autonomous vehicle;

filtering sensor data, from one or more sensors of the autonomous vehicle, to remove one or more objects that match a tracked high precision object;

determining, by the planner, a modified trajectory or a new trajectory for the autonomous vehicle based at least in part on the updated map of the environment comprising a speed limit determined based on the throttle input and/or the brake input, and by incorporating the filtered sensor data and environmental data associated with a physical environment of the autonomous vehicle; and controlling the autonomous vehicle according to the modified trajectory or the new trajectory.

2. The method of claim 1, further comprising determining, by the teleoperation system or by the autonomous vehicle, an event or a condition associated with at least a portion of the existing trajectory.

3. The method of claim 2, wherein the teleoperation input is entered responsive to the event or condition associated with the at least the portion of the existing trajectory.

4. The method of claim 2, wherein the event or condition comprises a road construction, a weather condition, a stop sign, or a school zone.

5. The method of claim 1, wherein the teleoperation input is based on real time information of the autonomous vehicle.

6. The method of claim 5, further comprising presenting visualization data that comprises the real time information of the autonomous vehicle on a display to enable a teleoperator to determine whether to intervene in operation of a planner of the autonomous vehicle.

7. The method of claim 1, wherein the teleoperation input further comprises a modification to classification of an object or obstacle in an environment of the autonomous vehicle or guidance for causing the autonomous vehicle to ignore or avoid the object or obstacle.

8. A system for controlling an autonomous vehicle, comprising:

a teleoperation receiver, configured to receive, through a communication link, a teleoperation input from a teleoperation system, wherein the teleoperation input is formed by combining and synthesizing inputs entered into the teleoperation system by a teleoperator mimicking direct control of a vehicle by a driver, and wherein the inputs comprise a steering input to alter a steering angle of the vehicle, a throttle input to change a throttle position for the vehicle, and/or a brake input to change a brake position for the vehicle; and a processor, configured to:

generate an updated map based on (i) the received teleoperation input from the teleoperation system, (ii) a current position and a current orientation of the autonomous vehicle and (iii) an existing trajectory of the autonomous vehicle, wherein the updated map provides a new path for the autonomous vehicle to traverse for avoiding an event or road condition;

providing the updated map to a planner of the autonomous vehicle;

filtering sensor data, from one or more sensors of the autonomous vehicle, to remove one or more objects that match a tracked high precision object;

determine, by the planner, a modified trajectory or a new trajectory for the autonomous vehicle based at least in part on the updated map of the environment comprising a speed limit determined based on the throttle input and/or the brake input, and by incorporating the filtered sensor data and environmental data associated with a physical environment of the autonomous vehicle; and control the autonomous vehicle according to the modified trajectory or the new trajectory.

9. The system of claim 8, wherein the processor or the teleoperation system is further configured to determine, by the teleoperation system or by the autonomous vehicle, an event or a condition associated with at least a portion of the existing trajectory.

10. The system of claim 9, wherein the teleoperation input is entered in response to the event or condition associated with the at least the portion of the existing trajectory.

11. The system of claim 9, wherein the event or condition comprises a road construction, a weather condition, a stop sign, a school zone, an accident zone, or a flood zone.

12. The system of claim 8, wherein the teleoperation input is based on real time information of the autonomous vehicle.

13. The system of claim 12, wherein the teleoperation system is configured to present visualization data comprising the real time information of the autonomous vehicle on the display to enable a teleoperator to determine whether to intervene in operation of a planner of the autonomous vehicle.

14. The system of claim 8, wherein the teleoperation input further comprises a modification to classification of an object or obstacle in an environment of the autonomous vehicle or guidance for causing the autonomous vehicle to ignore or avoid the object or obstacle.

* * * * *